(12) United States Patent
Ueda et al.

(10) Patent No.: US 8,471,504 B2
(45) Date of Patent: Jun. 25, 2013

(54) MOTOR CONTROLLER AND ELECTRIC POWER STEERING SYSTEM

(75) Inventors: Takeshi Ueda, Kashiba (JP); Shigeki Nagase, Nabari (JP)

(73) Assignee: JTEKT Corporation, Osaka-shi (JP)

( * ) Notice: Subject to any disclaimer, the term of this patent is extended or adjusted under 35 U.S.C. 154(b) by 475 days.

(21) Appl. No.: 12/935,816

(22) PCT Filed: Mar. 30, 2009

(86) PCT No.: PCT/JP2009/056505
§ 371 (c)(1),
(2), (4) Date: Sep. 30, 2010

(87) PCT Pub. No.: WO2009/123118
PCT Pub. Date: Oct. 8, 2009

(65) Prior Publication Data
US 2011/0043144 A1   Feb. 24, 2011

(30) Foreign Application Priority Data

Mar. 31, 2008  (JP) ................. 2008-092888

(51) Int. Cl.
*H02P 6/08* (2006.01)
*B62D 5/04* (2006.01)
*B62D 6/00* (2006.01)

(52) U.S. Cl.
USPC ............ 318/400.02; 318/400.09; 318/400.22

(58) Field of Classification Search
USPC ................. 318/700, 400.02, 400.04, 400.05, 318/400.07, 400.09, 400.15, 400.21, 400.22
See application file for complete search history.

(56) References Cited

U.S. PATENT DOCUMENTS

| 6,611,124 | B2 | 8/2003 | Ishida |
| 7,141,948 | B2 | 11/2006 | Kifuku et al. |
| 7,188,702 | B2 | 3/2007 | Takagi et al. |
| 7,355,364 | B2 * | 4/2008 | Gonzalez-Banos et al. ............ 318/568.22 |

(Continued)

FOREIGN PATENT DOCUMENTS

| CN | 1497832 A | 5/2004 |
| CN | 1741368 A | 3/2006 |

(Continued)

OTHER PUBLICATIONS

U.S. Appl. No. 12/812,678, filed Jul. 13, 2010, Ueda, et al.

(Continued)

*Primary Examiner* — Bentsu Ro
(74) *Attorney, Agent, or Firm* — Oblon, Spivak, McClelland, Maier & Neustadt, L.L.P.

(57) ABSTRACT

In a motor controller, a current detection unit detects an electric current flowing through a brushless motor. An open loop control unit determines a command value indicating a level of a command voltage in accordance with a motor circuit equation, based on a command current value indicating an amount of electric current to be supplied to the brushless motor and an angular velocity of a rotor in the brushless motor. A correction unit calculates a correction value based on a difference between the command current value and a current value detected by the current detection unit when the electric current is detected by the current detection unit and corrects the command value according to the correction value, and corrects the command value according to the correction value even when an electric current is not detected by the current detection unit.

10 Claims, 4 Drawing Sheets

U.S. PATENT DOCUMENTS

| | | |
|---|---|---|
| 7,589,486 B2 * | 9/2009 | Yamada et al. ............... 318/432 |
| 8,237,392 B2 * | 8/2012 | Ueda et al. .................... 318/599 |
| 2005/0045414 A1 | 3/2005 | Takagi et al. |
| 2006/0043917 A1 | 3/2006 | Kifuku et al. |
| 2008/0191655 A1 | 8/2008 | Ueda et al. |
| 2010/0280714 A1 | 11/2010 | Ueda et al. |

FOREIGN PATENT DOCUMENTS

| | | |
|---|---|---|
| EP | 0 743 745 B1 | 11/1996 |
| JP | 8 317698 | 11/1996 |
| JP | 3185604 B2 | 5/2001 |
| JP | 2001 245497 | 9/2001 |
| JP | 2003 276619 | 10/2003 |
| JP | 2004 64839 | 2/2004 |
| JP | 2004 64903 | 2/2004 |
| JP | 2004-336913 A | 11/2004 |
| JP | 2007 166711 | 6/2007 |

OTHER PUBLICATIONS

U.S. Appl. No. 12/935,784, filed Sep. 30, 2010, Ueda, et al.

Chinese Office Action issued Jul. 20, 2012 in Patent Application No. 200980111526.4 with English Translation.

International Search Report issued Jun. 30, 2009 in PCT/JP09/056505 filed Mar. 30, 2009.

* cited by examiner

MOTOR CONTROLLER AND ELECTRIC POWER STEERING SYSTEM

TECHNICAL FIELD

The present invention relates to a motor controller and an electric power steering system including the motor controller.

BACKGROUND ART

There has been used an electric power steering system configured to drive an electric motor according to steering torque exerted on a handle (a steering wheel) by a driver, thereby providing auxiliary steering force to a steering mechanism of a vehicle. A brush motor has been widely used as an electric motor of the electric power steering system. Recently, brushless motors are also used from the viewpoint of improvements in reliability and durability and the reduction of inertia, etc.

In order to control torque generated in a motor, a motor controller usually detects an electric current flowing through the motor and performs PI control operation (a proportional-integral control) in accordance with a difference between an electric current to be supplied to the motor and the detected electric current. The motor is, for example, a three-phase brushless motor, and is driven by three types of PWM signals having a duty ratio based on levels of three-phase voltages. The motor controller that drives the three-phase brushless motor includes two or three current sensors for detecting electric currents having two phases or more.

In relation to the present invention, JP-A-8-317698 discloses a configuration for determining a d-axis command voltage and a q-axis command voltage by use of a motor circuit equation and correcting the d-axis command voltage and the q-axis command voltage during regenerative operation in order to improve the torque characteristics. JP-A-2004-64839 also discloses a configuration for estimating a state of motor load from an electric current flowing through the motor, thereby correcting the duty ratio for the PWM signals. Moreover, JP-A-2007-166711 also discloses a configuration for correcting the duty ratio according to a supply voltage.

DISCLOSURE OF THE INVENTION

Problems to be Solved by the Invention

In the motor controller contained in the electric power steering system, the current sensor needs to detect a large electric current of 100A or more. A size of such current sensor is large, which avoids a reduction of the size of a controller of an electric power steering system. Therefore, the motor controller contained, e.g., in the electric power steering system is desired to reduce the number of current sensors. The reduction of the number of current sensors leads to the reduction of cost and power consumption of the motor controller.

A considerable method for reducing the number of current sensors is a method for reducing the number of current sensors to one and performing feedback control analogous as in the related art, a method for removing all current sensors and performing open loop control (feedforward control) in accordance with a motor circuit equation, or the like.

However, according to the former method, depending on a rotational position of a rotor of the motor, one current sensor may fail to detect currents of a plurality of phases required for feedback control, which results in that motor control becomes discontinuous. According to the latter method, the motor can consecutively be controlled. However, if a parameter in the motor circuit equation varies, the motor may not be controlled properly.

An object of the present invention is to provide a motor controller capable of driving a motor with high accuracy even when a parameter used for calculating a motor drive voltage varies, and an electric power steering system including the motor controller.

Means for Solving the Problems

In a first invention, a motor controller configured to drive a brushless motor, said motor controller comprises: current detection means for detecting an electric current flowing through the brushless motor; open loop control means for determining a command value indicating a level of a command voltage for driving the brushless motor in accordance with a motor circuit equation, based on a command current value indicating an amount of electric current to be supplied to the brushless motor and an angular velocity of a rotor in the brushless motor; correction means for calculating a correction value based on a difference between the command current value and a current value detected by the current detection means when the electric current is detected by the current detection means and correcting the command value according to the calculated correction value, and for correcting the command value according to the correction value even when an electric current is not detected by the current detection means; and motor drive means for driving the brushless motor using a voltage having a level indicated by the command value corrected by the correction means, wherein the motor drive means comprises a switching circuit including a plurality of switching elements and configured to supply an electric current to the brushless motor.

In a second invention, the motor controller according to the first invention, wherein the current detection means, a number of which is only one, is provided between the switching circuit and a power supply.

In a third invention, the motor controller according to the first or second invention, wherein, when the electric current is detected by the current detection means, the correction means calculates a d-axis correction voltage value and a q-axis correction voltage value as the correction value based on values determined by subtracting a d-axis current value and a q-axis current value detected by the current detection means from a d-axis current value and a q-axis current value as the command current value, respectively, and corrects a d-axis command voltage value and a q-axis command voltage value according to the calculated d-axis correction voltage value and the calculated q-axis correction voltage value, and even when the electric current is not detected by the current detection means, the correction means calculates the d-axis command voltage value and the q-axis command voltage value according to the d-axis correction voltage value and the q-axis correction voltage value.

In a fourth invention, the motor controller according to the first or second invention, wherein the motor drive means further comprises signal generation means for generating a signal for turning on or off each of the plurality of switching elements, and wherein the correction means corrects a duty ratio indicating a ratio of an ON period to an OFF period of the signal determined from the command value, based on the correction value.

In a fifth invention, the motor controller according to any one of the first to fourth inventions, further comprises nonvolatile storage means configured to store values, wherein the correction means stores the correction value in the nonvolatile storage means at each of time points with predetermined intervals or when operation of said motor controller is stopped, and reads the correction value stored in the nonvolatile storage means when said motor controller is started.

In a sixth invention, an electric power steering system comprises the motor controller according to any one of the first to fifth inventions.

Advantages of the Invention

According to the first invention, the command value is determined based on the command current value and the angular velocity of the rotor in accordance with a motor circuit equation and through open loop control. Even when the electric current is not detected by the current detection means, the command value is corrected by the correction value calculated based on the current value which has been detected by the current detection means. Accordingly, even when a parameter (e.g., a value D, a value R, or the like) in the motor circuit equation varies due to production variations and temperature variations, the correction value is calculated based on the current value detected by the current detection means. Consequently, the brushless motor can be driven with high accuracy, to thus produce a desired motor output.

According to the second invention, the current detection means, the number of which is only one, is provided, hence the size, cost, and power consumption of the motor controller can be reduced. Further, as compared with a motor controller that performs feedback control, for example, using one current sensor, control of the motor controller does not become discontinuous, and hence generation of sounds and vibrations can be prevented.

According to the third invention, the command voltage values based on the dq axes are corrected by the correction voltage values based on the dq axes. Hence, the correction values can be calculated by simple calculation.

According to the fourth invention, the duty ratio for the signal supplied to the switching circuit (typically a PWM signal) is corrected directly by the correction value. Consequently, the correction value can be calculated by simple calculation. Further, an error in the conversion from the voltage value to the duty ratio is not caused. Hence, the brushless motor can be driven with higher accuracy.

According to the fifth invention, the correction value is stored in the nonvolatile storage means, and the correction value stored at a start of the operation of the controller is read. Hence, even when a known parameter such as the parameter of a motor circuit equation is different from an actual value, it is possible to perform control with superior accuracy from when the motor controller starts its operation.

According to the sixth invention, even when a parameter used for determining the command value varies due to production variations and temperature variations, the motor can be driven with high accuracy, to thus produce a desired motor output. Therefore, smooth steering assist becomes possible.

DESCRIPTION OF REFERENCE SYMBOLS

10: ELECTRONIC CONTROL UNIT (ECU), 13: MOTOR DRIVE CIRCUIT, 20: MICROCOMPUTER

BEST MODE FOR CARRYING OUT THE INVENTION

Embodiments of the present invention are described by reference to the accompanying drawings.

Figure 1:
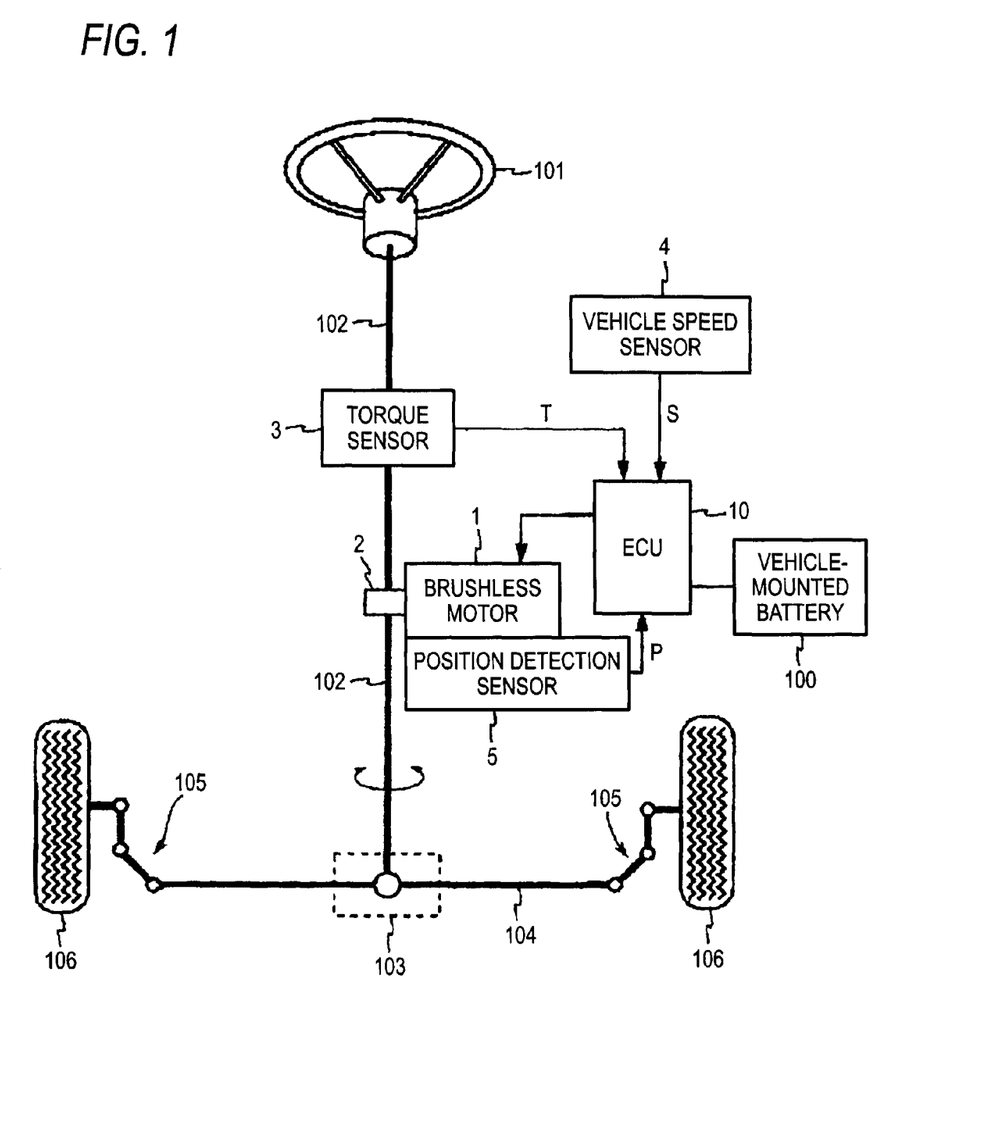
FIG. 1 is a schematic diagram showing a configuration of an electric power steering system of an embodiment of the present invention.

1. First Embodiment 1.1 Overall Configuration of an Electric Power Steering System FIG. 1 is a schematic diagram showing a configuration of an electric power steering system of a first embodiment of the present invention and a configuration of a vehicle relevant to the electric power steering system. The electric power steering system shown in FIG. 1 is a column assist electric power steering system including a brushless motor 1, a speed reduction gear 2, a torque sensor 3, a vehicle speed sensor 4, a position detection sensor 5, and an electronic control unit (hereinafter called an "ECU") 10.

As shown in FIG. 1, a handle (a steering wheel) 101 is secured to one end of a steering shaft 102, and the other end of the steering shaft 102 is linked to a rack shaft 104 via a rack and pinion mechanism 103. Each end of the rack shaft 104 is linked to a travel wheel 106 via a link member 105 including a tie rod and a steering knuckle arm. When a driver turns the steering wheel 101, the steering shaft 102 rotates, and the rack shaft 104 performs reciprocal movements. A direction of the wheels 106 is changed in association with the reciprocal movements of the rack shaft 104.

In order to reduce a driver's burden, the electric power steering system performs steering assist described below. The torque sensor 3 detects steering torque T applied to the steering shaft 102 as a result of operation of the steering wheel 101. The vehicle speed sensor 4 detects a vehicle speed S. The position detection sensor 5 detects a rotational position P of the rotor of the brushless motor 1. The position detection sensor 5 includes, for example, a resolver.

Upon receipt of a power supply from a vehicle-mounted battery 100, the ECU 10 drives the brushless motor 1 according to the steering torque T, the vehicle speed S, and the rotational position P. When driven by the ECU 10, the brushless motor 1 generates steering assist force. The speed reduction gear 2 is provided between the brushless motor 1 and the steering shaft 102. The steering assist force generated by the brushless motor 1 acts so as to rotate the steering shaft 102 via the speed reduction gear 2.

As a result, the steering shaft 102 is rotated by the steering torque exerted on the steering wheel 101 and the steering assist force generated by the brushless motor 1. The electric power steering system performs steering assist by applying the steering assist force generated by the brushless motor 1 to a steering mechanism of a vehicle.

The electric power steering system of the present embodiment of the present invention is characterized by a controller (a motor controller) that drives the brushless motor 1. The motor controller included in the electric power steering system of the present embodiment is hereunder described.

1.2 Overall Configuration of a Motor Controller

Figure 2:
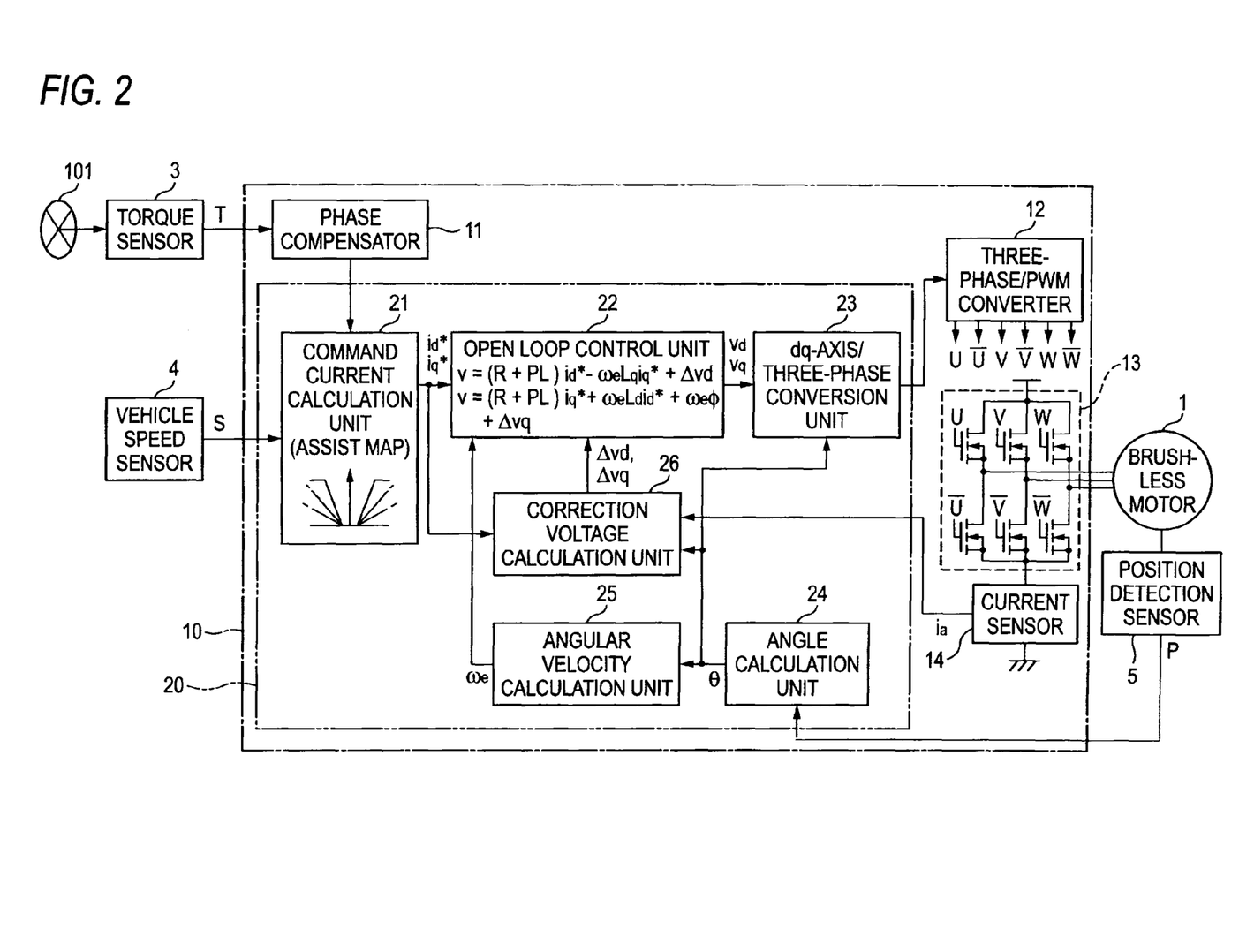
FIG. 2 is a block diagram showing a configuration of a motor controller of the first embodiment of the present invention.

FIG. 2 is a block diagram showing a configuration of a motor controller of the first embodiment of the present invention. The motor controller shown in FIG. 2 includes the ECU 10 and drives the brushless motor 1 including three-phase windings (not shown), i.e., a u-phase winding, a v-phase winding, and a w-phase winding. The ECU 10 includes a phase compensator 11, a microcomputer 20, a three-phase/PWM (Pulse Width Modulation) modulator 12, a motor drive circuit 13, and a current sensor 14.

The steering torque T output from the torque sensor 3, the vehicle speed S output from the vehicle speed sensor 4, and the rotational position P output from the position detection sensor 5 are input to the ECU 10. The phase compensator 11 subjects the steering torque T to phase compensation. The microcomputer 20 serves as control means for determining a level of a command voltage used for driving the brushless motor 1. Details of the functions of the microcomputer 20 will be described later.

The three-phase/PWM modulator 12 and the motor drive circuit 13 include hardware (circuits) and serve as motor drive means for driving the brushless motor 1 using the voltage level determined by the microcomputer 20. In order to generate three types of PWM signals (U, V, and W shown in FIG. 2) having a duty ratio based on levels of the three-phase voltages determined by the microcomputer 20, the three-phase/PWM modulator 12 receives a voltage signal corresponding to the duty ratio from the microcomputer 20 and generates the three types of PWM signals having the duty ratio. The motor drive circuit 13 is a PWM voltage-type inverter circuit including six MOS-FETs (Metal Oxide Semiconductor Field Effect Transistors) serving as switching elements. The six MOS-FETs are controlled by three types of PWM signals and their negative signals. States of electrical conduction of the MOS-FETs are controlled by use of the PWM signals, whereby three-phase drive currents (i.e., a U-phase current, a V-phase current, and a W-phase current) are supplied to the brushless motor 1. The motor drive circuit 13 includes a plurality of switching elements and serves as a switching circuit configured to supply an electric current to the brushless motor 1.

The current sensor 14 serves as current detection means for detecting an electric current flowing through the brushless motor 1. The current sensor 14 includes, for example, a resistor and a hall element, and only one current sensor is provided between the motor drive circuit 13 and a power supply. In the example shown in FIG. 2, the current sensor 14 is provided between the motor drive circuit 13 and a negative side (a ground) of the power supply. However, the current sensor 14 may be provided between the motor drive circuit 13 and a positive side of the power supply.

During rotation of the brushless motor 1, current values detected by the current sensor 14 change according to the PWM signal. One cycle of the PWM signal includes a period in which the current sensor 14 detects a drive current of one phase and another period in which a sum of drive currents having two phases is detected. When no difference exists between three phase command values Vu, Vv, and Vw, no current can be detected. Three-phase drive currents can be detected by use of one current sensor 14 during rotation of the brushless motor 1, although there is a period in which the electric current cannot be detected since only one current sensor 14 is provided as described above. A current value is detected by the current sensor 14 is input to the microcomputer 20.

The microcomputer 20 executes a program stored in memory (not shown) incorporated in the ECU 10, thereby serving as a command current calculation unit 21, an open loop control unit 22, a dq-axis/three-phase conversion unit 23, an angle calculation unit 24, an angular velocity calculation unit 25, and a corrected voltage calculation unit 26. As described below, the microcomputer 20 determines a level of a voltage (hereinafter called a "command voltage") to be supplied to the motor drive circuit 13 in accordance with the motor circuit equation, based on a command current value indicating an amount of electric current to be supplied to the brushless motor 1 and an angular velocity of the rotor of the brushless motor 1. Functions of individual units implemented by operation of the microcomputer 20 are hereinbelow described in detail.

1.3 Operation of the Microcomputer

Figure 3:
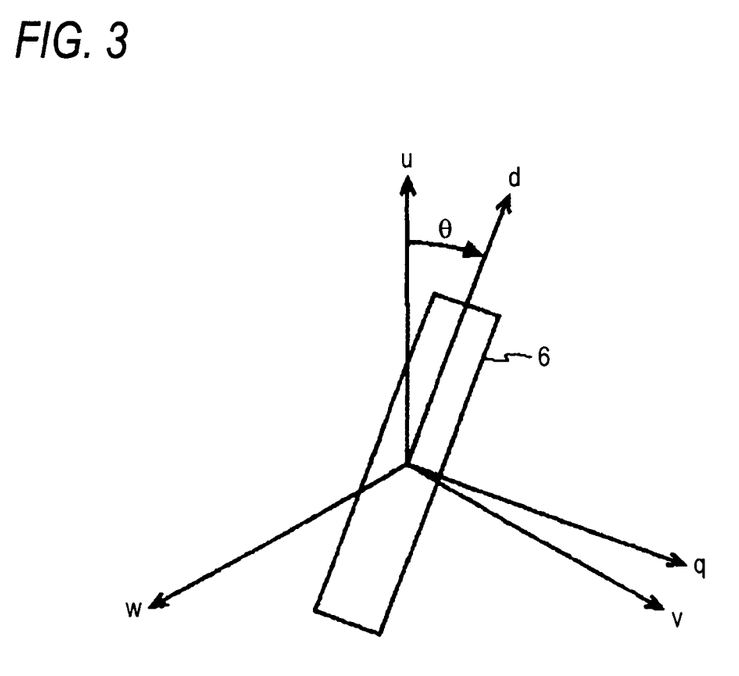
FIG. 3 is a view showing three-phase alternating current (AC) coordinates and dq coordinates of a three-phase brushless motor.

The angle calculation unit 24 serving as a functional element in the microcomputer 20 determines a rotational angle (hereinafter called an "angle $\theta$") of the rotor of the brushless motor 1 based on the rotational position P detected by the position detection sensor 5. The angular velocity calculation unit 25 determines an angular velocity we of the rotor of the brushless motor 1 based on the angle $\theta$. As shown in FIG. 3, when an "u" axis, a "v" axis, and a "w" axis are set for the brushless motor 1 and when a "d" axis and a "q" axis are set for the rotor 6 of the brushless motor 1, an angle that the "u" axis forms with the "d" axis is the angle $\theta$.

The command current calculation unit 21 determines the d-axis current and the q-axis current to be supplied to the brushless motor 1 (the former current is hereinafter called a "d-axis command current id*," and the latter current is hereinafter called a "q-axis command current iq*") based on the steering torque T which has been subjected to phase compensation (a signal output from the phase compensator 11) and the vehicle speed S. More specifically, the command current calculation unit 21 incorporates a table (hereinafter called an "assist map") that stores a correspondence between the steering torque T and a command current while taking the vehicle speed S as a parameter, and determines the command currents by reference to the assist map. By using the assist map, when a certain magnitude of steering torque is provided, the d-axis command current id* and the q-axis command current iq* to be supplied to the brushless motor 1 in order to generate steering assist force having a magnitude commensurate with the certain magnitude of the steering torque.

The q-axis command current iq* determined by the command current calculation unit 21 is a signed current value, and the sign represents a direction of steering assist. For example, when the sign is positive, steering assist for a right turn is performed. In contrast, when the sign is negative, steering assist for a left turn is performed. The d-axis command current id* is typically set to zero.

The open loop control unit 22 determines a d-axis voltage and a q-axis voltage (the former voltage is hereinafter called a "d-axis command voltage vd," and the latter voltage is hereinafter called a "q-axis command voltage vq") to be supplied to the brushless motor 1 based on the d-axis command current id*, the q-axis command current iq*, the angular velocity we, and a d-axis correction voltage $\Delta$vd and a q-axis correction voltage $\Delta$vq which are described later. The d-axis command voltage vd and the q-axis command voltage vq are calculated by use of the following equations (1) and (2)

in which the d-axis correction voltage Δvd and the q-axis correction voltage Δvq are added to the motor circuit equation, respectively.

$$vd = (R+PLd)id^* - \omega eLqiq^* + \Delta vd \quad (1)$$

$$vq = (R+PLq)iq^* + \omega eLdid^* + \omega e\Phi + \Delta vq \quad (2)$$

In Equations (1) and (2), reference symbol vd designates a d-axis command voltage; vq designates a q-axis command voltage; id* designates a d-axis command current; iq* designates a q-axis command current; ωe designates an angular velocity of the rotor; R designates circuit resistance including armature winding resistance; Ld designates a d-axis self-inductance; Lq designates a q-axis self-inductance; Φ designates a product obtained by multiplying a maximum number among armature winding magnetic fluxes of U-phase, V-phase and W-phase by √(3/2); and P designates a differential operator. Among the factors, R, Ld, Lq, and Φ are taken as known parameters. The circuit resistance includes wiring resistance between the brushless motor 1 and the ECU 10, the resistance of the motor drive circuit 13 and wiring resistance in the ECU 10, etc. The same also applies to the following embodiment(s).

As a matter of course, in relation to the known parameters, such as the circuit resistor R, a (idealistic) value common to all devices is usually used. Therefore, a difference exists between the common value and an actual value, and hence a decrease in control accuracy due to the difference is inevitable. Even when an actually measured value is used for individual devices at shipment, aging changes and changes caused by heat generated during operation cannot perfectly be reflected on the parameters, which deteriorates control accuracy. In the present embodiment, the d-axis correction voltage Δvd and the q-axis correction voltage Δvq, which will be described alter, are used in the present embodiment, thereby providing a control without deterioration of accuracy due to such a difference between an idealistic value and an actual value. Detailed descriptions are provided later.

The dq-axis/three-phase conversion unit 23 converts the d-axis command voltage vd and the q-axis command voltage vq determined by the open loop control unit 22 into command voltages based on three-phase AC coordinate axes. In more detail, the dq-axis/three-phase conversion unit 23 determines the u-phase command voltage Vu, the v-phase command voltage Vv, and the w-phase command voltage Vw based on the d-axis command voltage vd and the q-axis command voltage vq and by use of Equations (3) to (5) provided below.

$$Vu = \sqrt{(2/3)} \times \{vd \times \cos\theta - vq \times \sin\theta\} \quad (3)$$

$$Vv = \sqrt{(2/3)} \times \{vd \times \cos(\theta - 2\pi/3) - vq \times \sin(\theta - 2\pi/3)\} \quad (4)$$

$$Vw = -Vu - Vv \quad (5)$$

The angle θ included in Equations (3) and (4) is determined by the angle calculation unit 24.

The dq-axis/three-phase conversion unit 23 outputs a voltage signal specifying the duty ratio for the PWM signals to be output from the three-phase/PWM modulator 12 according to the determined u-phase command voltage Vu, the v-phase command voltage Vv, the w-phase command voltage Vw, and a supply voltage detected by a voltage detector of a power supply not shown (a battery in the embodiment).

As described above, the microcomputer 20 performs processing for determining the command current id* and the command current iq* based on the dq coordinate axes, processing for determining the command voltages vd and vq based on the dq coordinate axes by use of the d-axis correction voltage Δvd and the q-axis correction voltage Δvq in accordance with the motor circuit equation, and processing for converting the command voltages vd and vq into three-phase command voltages Vu, Vv, and Vw.

According to the voltage signal specifying the duty ratio based on the three-phase command voltages Vu, Vv, and Vw output from the microcomputer 20, the three-phase/PWM modulator 12 outputs the three types of the PWM signals. Sinusoidal electric currents based on the command voltages of the respective phases thereby flow through the windings of the three-phase brushless motor 1, whereupon the rotor of the brushless motor 1 rotates. Torque based on the electric currents flowing through the brushless motor 1 is generated in the rotary shaft of the brushless motor 1. The generated torque is used for steering assist.

The current value is detected by the current sensor 14, the angle θ calculated by the angle calculation unit 24, and the d-axis command current id* and the q-axis command current iq* determined by the command current calculation unit 21 are input to the correction voltage calculation unit 26. The correction voltage calculation unit 26 calculates the d-axis detection current id and the q-axis detection current iq based on the detected current value ia and the calculated angle θ and determines the d-axis correction voltage Δvd and the q-axis correction voltage Δvq such that a deviation between the detected currents and the command currents comes to zero. Even when the known parameter in the motor circuit equation differs from an actual value, it thereby becomes possible to perform control with superior accuracy. Operation of the correction voltage calculation unit 26 is described in more detail.

1.4 Operation of the Correction Voltage Calculation Unit

First, the correction voltage calculation unit 26 determines a u-phase current and a v-phase current flowing through the brushless motor 1 (the former current is hereinafter called a u-phase detection current iu, and the latter current is hereinafter called a v-phase detection current iv) based on the current value ia detected by the current sensor 14, and the u-phase and v-phase currents are converted into a current value based on the dq coordinate axes. More specifically, the correction voltage calculation unit 26 determines the d-axis detection current id and the q-axis detection current iq from the u-phase detection current iu and the v-phase detection current iv by use of Equations (6) and (7) provided below.

$$id = \sqrt{2} \times \{iv \times \sin\theta - iu \times \sin(\theta - 2\pi/3)\} \quad (6)$$

$$iq = \sqrt{2} \times \{iv \times \cos\theta - iu \times \cos(\theta - 2\pi/3)\} \quad (7)$$

The angle θ included in Equations (6) and (7) is determined by the angle calculation unit 24.

The correction voltage calculation unit 26 then multiplies the above-described current deviation by appropriately determined proportional gains Kd and Kq, thereby calculating the d-axis correction voltage Δvd and the q-axis correction voltage Δvq. Specifically, where a value determined by subtracting the d-axis detection current id from the d-axis command current id* is defined as a d-axis current deviation Δid and where a value determined by subtracting the q-axis detection current iq from the q-axis command current iq* is defined as a q-axis current deviation Δiq, the d-axis correction voltage Δvd and the q-axis correction voltage Δvq are determined by use of Equations (8) and (9) provided below.

$$\Delta vd = \Delta id \times Kd \quad (8)$$

$$\Delta vq = \Delta iq \times Kq \quad (9)$$

The correction voltage calculation unit 26 may be calculate the d-axis correction voltage $\Delta vd$ and the q-axis correction voltage $\Delta vq$ by use of Equations (10) and (11) that multiplies the respective current deviations by appropriately determined proportional gains Kpd and Kpq and appropriately determined integral gains Kid and Kiq.

$$\Delta vd = \Delta id \times Kpd + 1/P(\Delta id \times Kid) \quad (10)$$

$$\Delta vq = \Delta iq \times Kpq + 1/P(\Delta iq \times Kiq) \quad (11)$$

In Equations (10) and (11), 1/P is an integral operator.

If control for setting the d-axis command voltage vd and the q-axis command voltage vq by determining the d-axis correction voltage $\Delta vd$ and the q-axis correction voltage $\Delta vq$ such that the current deviations come to zero is always performed, the control operation can be called feedback control rather than open loop control. However, as mentioned previously, the current sensor 14 of the embodiment is provided for not all the phases, but only one current sensor 14 is provided. Therefore, there may be a period in which an electric current cannot be detected. Therefore, in the present embodiment, current feedback control cannot be performed, and above-described open loop control has to be performed.

The following are conceivable way to determine the d-axis correction voltage $\Delta vd$ and the q-axis correction voltage $\Delta vq$ in a case in which the current sensor 14 can not detect an electric current. First, a conceivable configuration as a most simple method is to use the d-axis correction voltage $\Delta vd$ and the q-axis correction voltage $\Delta vq$ which is calculated at a most recent time point at which the electric currents can be detected, even when an electric current cannot be detected. Further, in a case in which the command currents or the angular velocity of the motor change, another conceivable configuration is to calculate the d-axis correction voltage $\Delta vd$ and the q-axis correction voltage $\Delta vq$ on the assumption that the d-axis correction voltage $\Delta vd$ and the q-axis correction voltage $\Delta vq$ also change at the same rates as those at which the command currents or the velocity of the motor changes from the most recent time point. In that case, it is possible to calculate the d-axis correction voltage $\Delta vd$ and the q-axis correction voltage $\Delta vq$ with comparatively superior accuracy.

Specifically, where the d-axis correction voltage $\Delta vd$ and the q-axis correction voltage $\Delta vq$ which are calculated at the most recent time point at which the currents can be detected are defined as a d-axis most recent correction voltage $\Delta vd(n-1)$ and a q-axis most recent correction voltage $\Delta vq(n-1)$ so as to be distinguished from a d-axis correction voltage $\Delta vd$ and a q-axis correction voltage $\Delta vq$ which are calculated when the electric current can not be detected, and where the command currents acquired at the most recent time point are defined as a d-axis most recent command current $id^*(n-1)$ and a q-axis most recent command current $iq^*(n-1)$, the d-axis correction voltage $\Delta vd$ and the q-axis correction voltage $\Delta vq$ which are calculated when the electric currents can not be detected can be represented by Equations (12) and (13).

$$\Delta vd = \Delta vd(n-1) \times id^*/id^*(n-1) \quad (12)$$

$$\Delta vq = \Delta vq(n-1) \times iq^*/iq^*(n-1) \quad (13)$$

The q-axis command voltage vq is greatly affected by the motor angular velocity $\omega$. Accordingly, where the angular velocity acquired at the most recent time point is defined as most recent angular velocity $\omega(n-1)$, the q-axis correction voltage $\Delta vq$ can be represented by Equation (14) in place of the equation (13).

$$\Delta vd = \Delta vq(n-1) \times \omega/\omega(n-1) \quad (14)$$

The calculation of the q-axis correction voltage $\Delta vq$ may use at least one of the q-axis most recent command current $iq^*(n-1)$ and an most recent angular velocity $\omega(\omega-1)$, for example, an average of the correction voltages determined by Equations (13) and (14). Further, the d-axis correction voltage $\Delta vd$ and the q-axis correction voltage $\Delta vq$ can also be expressed by Equations (15) and (16) provided below, by use of the d-axis most recent command voltage vd(n-1) and the q-axis most recent command voltage vq(n-1) which are command voltages acquired at the most recent time point.

$$\Delta vd = \Delta vd(n-1) \times ((R+PLd)id^* - \omega eLqiq^*)/(vd(n-1) - \Delta vd(n-1)) \quad (15)$$

$$\Delta vq = \Delta vq(n-1) \times ((R+PLd)iq^* + \omega eLdid^* + \omega e\Phi)/(vq(n-1) - \Delta vq(n-1)) \quad (16)$$

Parameters required for calculating the d-axis correction voltage $\Delta vd$ and the q-axis correction voltage $\Delta vq$ when the electric currents can not be detected are temporarily stored typically in volatile memory (not shown) incorporated in the ECU 10. The parameters include: the d-axis most recent correction voltage $\Delta vd(n-1)$ and the q-axis most recent correction voltage $\Delta vq(n-1)$; and the d-axis most recent command current $id^*(n-1)$ and the q-axis most recent command current $iq^*(n-1)$, the most recent angular velocity $w(n-1)$, or the d-axis most recent command voltage vd(n-1) and the q-axis most recent command voltage vq(n-1), which are at the most recent time point. Therefore, when the power supply is deactivated by the stop of operation of the motor controller, the values stored in the memory are also erased.

However, the values are used for performing control with superior accuracy even when the known parameters in the motor circuit equation differ from actual values. Therefore, control operation with superior control operation can not be performed without use of these values. Consequently, if the values are not used immediately after the controller is started, control accuracy will become deteriorated, and a driver will feel a sense of discomfort when starting steering action.

For this reason, in the present embodiment, the values are stored in nonvolatile memory such as EEPROM (Electrically Erasable and Programmable Read Only Memory), and the values are written into the nonvolatile memory at startup of the motor controller. As a result, it becomes possible to perform control operation with superior accuracy immediately after startup of the controller.

Therefore, preferable timing for writing the values into the nonvolatile memory is immediately before the power of the controller is shut off. Specifically, the operation for writing the values into the nonvolatile memory is preferably performed in a shutdown sequence which is started when an ignition is turned off.

As a matter of course, the power supply of the controller is not always turned off after the shutdown sequence. For example, power supply may be suddenly turned off due to the dead battery. In this case, the values written in the nonvolatile memory are also lost. For this reason, it is desirable to repeatedly perform operation for periodically writing the values into the nonvolatile memory at the above-described timing or at predetermined time intervals instead of the timing.

The open loop control unit 22 determines the d-axis command voltage vd and the q-axis command voltage vq by use of Equations (1) and (2) based on the correction voltages $\Delta vd$ and $\Delta vq$ (and remaining values of the above-described values) (in reality, the d-axis most recent command voltage $\Delta vd(n-1)$ and the q-axis most recent command voltage $\Delta vq$ (n-1)). The dq-axis/three-phase conversion unit 23 converts these voltages into the command voltages Vu, Vv, and Vw of the respective phases. The three-phase/PWM modulator 12 modulates the voltages, to thus generate the PWM signals. The PWM signals are delivered to the motor drive circuit 13.

1.5 Advantages of the First Embodiment

As described above, the motor controller of the present embodiment determines the command voltages based on the command current values and the angular velocity of the rotor in accordance with the motor circuit equation through open loop control, and corrects the command voltages according to current values detected by the current sensor.

Therefore, in the motor controller of the present embodiment, even when the value Φ and the value R in the motor circuit equation vary due to production variations and temperature variations, the correction voltages Δvd and Δvq are calculated based on the current values detected by the current sensor, whereby the brushless motor can be driven with high accuracy, to thus produce a desired motor output.

In the motor controller of the present embodiment, only one current sensor is provided. Therefore, in the motor controller of the present embodiment, it becomes possible to reduce the size, cost, and power consumption of the motor controller by reducing the number of current sensors.

Moreover, the motor controller of the present embodiment performs open loop control operation. Therefore, as compared with the case of a motor controller that performs feedback control by use of one current sensor, motor control does not become discontinuous. Therefore, the motor controller of present embodiment can prevent generation of sounds or vibrations.

2. Second Embodiment

2.1 Configuration and Operation of the Motor Controller

Figure 4:
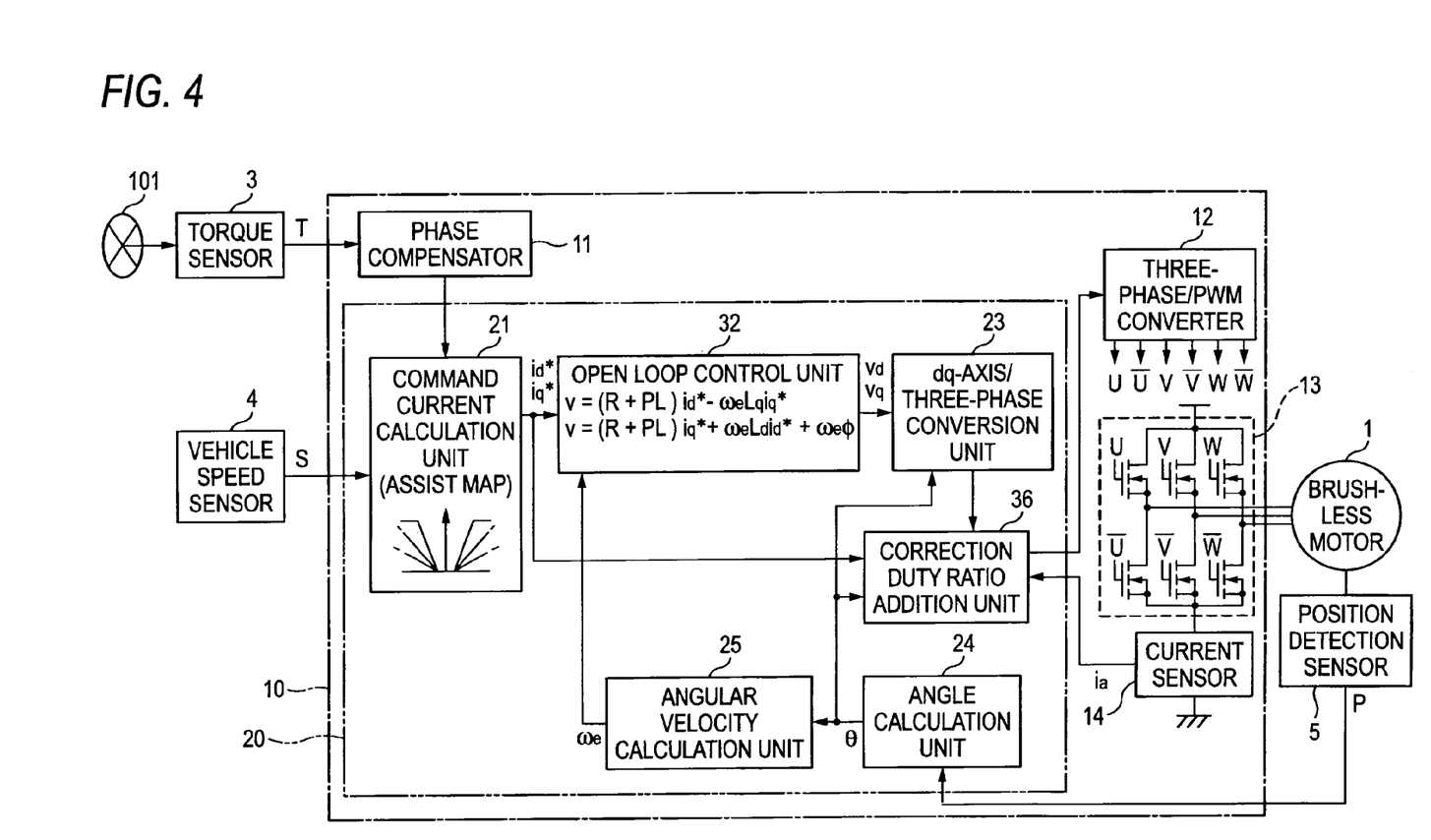
FIG. 4 is a block diagram showing a configuration of a motor controller of a second embodiment of the present invention.

FIG. 4 is a block diagram showing a configuration of a motor controller of a second embodiment of the present invention. The motor controller shown in FIG. 4 differs from the motor controller described in the first embodiment in that the microcomputer 20 including the correction voltage calculation unit 26 and the open loop control unit 22 that performs addition of correction voltages is replaced with another microcomputer 20 including a correction duty ratio addition unit 36 and an open loop control unit 32 that does not perform addition of correction voltages. Of the constituent elements described in the present embodiment, those elements that are the same as those of the previously-described embodiment are assigned the same reference numerals, and their repeated explanations are omitted.

The open loop control unit 32 determines the d-axis command voltage vd and the q-axis command voltage vq based on the d-axis command current id*, the q-axis command current iq*, and the angular velocity ωe. Specifically, the d-axis command voltage vd and the q-axis command voltage vq are calculated by use of the motor circuit equation in which the d-axis correction voltage Δvd and the q-axis correction voltage Δvq are eliminated from Equations (1) and (2).

The current value ia detected by the current sensor 14, the d-axis command current id* and the q-axis command current iq* determined by the command current calculation unit 21, and the angle θ calculated by the angle calculation unit 24 are input to the correction duty ratio addition unit 36.

First, the correction duty radio addition unit 36 determines the u-phase detection current iu, the v-phase detection current iv, and a w-phase detection current iw from the detected current value ia based on the angle θ. The correction duty radio addition unit 36 also determines a u-phase command current iu*, a v-phase command current iv*, and a w-phase command current iw* from the d-axis command current id* and the q-axis command current iq* based on the angle θ.

Next, the correction duty ratio addition unit 36 determines current deviations between the detection currents of the respective phases and the command currents of the respective phases. As in the case of the correction voltage calculation unit 26 of the first embodiment, the respective current deviations are multiplied by appropriately determined proportional gains Ku, Kv, and Kw, whereby correction duty voltages ΔVduty_u, ΔVduty_v, and ΔVduty_w are calculated. Specifically, a value determined by subtracting the u-phase detection current iu from the u-phase command current iu* is taken as a u-phase current deviation Δiu. A value determined by subtracting the v-phase detection current iv from the v-phase command current iv* is taken as a v-phase current deviation Δiv. A value determined by subtracting the w-phase detection current iw from the w-phase command current iw* is taken as a w-phase current deviation Δiw. By these values, the correction duty voltages ΔVduty_u, ΔVduty_v, and ΔVduty_w are determined by use of Equations (17), (18), and (19) provided blow.

$$\Delta V\text{duty}\_u = \Delta iu \times Ku \tag{17}$$

$$\Delta V\text{duty}\_v = \Delta iv \times Kv \tag{18}$$

$$\Delta V\text{duty}\_w = \Delta iw \times Kw \tag{19}$$

The correction duty voltages ΔVduty_u, ΔVduty_v, and ΔVduty_w are set to appropriate values from the supply voltages detected by a voltage detector of a power supply not shown (the battery in the embodiment). Since the voltage delivered to the brushless motor 1 changes according to the supply voltage, the duty ratio appropriate for the PWM signals to be output from the three-phase/PWM modulator 12 also changes according to the supply voltage.

The correction duty ratio addition unit 36 may determine the correction duty voltages ΔVduty_u, ΔVduty_v, and ΔVduty_w by use of Equations (20), (21), (22) for multiplying the deviations by appropriately-determined proportional gains Kpu, Kpv, and Kpw and appropriately-determined integral gains Kiu, Kiv, and Kiw.

$$\Delta V\text{duty}\_u = \Delta iu \times Kpu + 1/P(\Delta iu \times Kiu) \tag{20}$$

$$\Delta V\text{duty}\_v = \Delta iv \times Kpv + 1/P(\Delta iv \times Kiv) \tag{21}$$

$$\Delta V\text{duty}\_w = \Delta iw \times Kpw + 1/P(\Delta iw \times Kiw) \tag{22}$$

A parameter 1/P in Equations (20) to (22) is an integral operator.

Further, the correction duty ratio addition unit 36 receives, from the dq-axis/three-phase conversion unit 23, voltage signals Vduty_u, Vduty_v, and Vduty_w which specifies the duty ratio for the PWM signals and which are obtained based on the u-phase command voltage Vu, the v-phase command voltage Vv, and the w-phase command voltage Vw. The correction duty voltages ΔVduty_u, ΔVduty_v, and ΔVduty_w are added to the voltage signals of respective phases as indicated by Equations (23), (24), and (25) provided below. Voltage signals V'duty_u, V'duty_v, and V'duty_w showing the corrected duty ratio are thereby output to the three-phase/PWM modulator 12.

$$V'\text{duty}\_u = V\text{duty}\_u + \Delta V\text{duty}\_u \quad (23)$$

$$V'\text{duty}\_v = V\text{duty}\_v + \Delta V\text{duty}\_v \quad (24)$$

$$V'\text{duty}\_w = V\text{duty}\_w + \Delta V\text{duty}\_w \quad (25)$$

As described above, the microcomputer 20 performs processing for determining the command currents id* and iq* based on the dq-coordinate axes; processing for determining the command voltages vd and vq based on the dq coordinate axes in accordance with motor circuit equation; and processing for converting the command voltages vd and vq into the three-phase command voltages Vu, Vv, and Vw and outputting the voltage signals V'duty_u, V'duty_v, and V'duty_w which specify the corrected duty ratio and which are obtained based on these voltages.

The three-phase/PWM modulator 12 outputs three types of PWM signals according to the voltage signals V'duty_u, V'duty_v, and V'duty_w specifying the duty ratio based on the three-phase command voltages Vu, Vv, and Vw determined by the microcomputer 20. Sinusoidal electric currents based on the command voltages of the respective phases flow through the three-phase windings of the brushless motor 1, whereby the rotor of the brushless motor 1 rotates. Torque based on the electric currents flowing through the brushless motor 1 is generated in the rotary shaft of the brushless motor 1. The generated torque is used for steering assist. Therefore, the correction of the voltage signals Vduty_u, Vduty_v, and Vduty_w using the correction duty voltages ΔVduty_u, ΔVduty_v, and ΔVduty_w can be regarded as being identical with the correction of the duty ratio per se.

The control for determining the correction duty voltages ΔVduty_u, ΔVduty_v, and ΔVduty_w such that the current deviations come to zero is also performed even when the current sensor 14 cannot detect a current as in the first embodiment. Accordingly, the way to determine the values when an electric current can not be detected can be considered substantially the same as in the first embodiment.

A conceivable configuration as a most simple method is to use the correction duty voltages ΔVduty_u, ΔVduty_v, and ΔVduty_w calculated at a most recent time point at which the electric currents can be detected, even when the electric current cannot be detected. Further, in a case in which the command currents or the supply voltage changes, the correction duty voltages ΔVduty_u, ΔVduty_v, and ΔVduty_w can be calculated with comparatively superior accuracy, so long as computation is performed on the assumption that the correction duty voltages ΔVduty_u, ΔVduty_v, and ΔVduty_w also change at the same rates as those at which the command currents or the angular velocity of the motor changes from the most recent time point.

Specifically, where the correction duty voltages ΔVduty_u, ΔVduty_v, and ΔVduty_w which are calculated at the most recent time point at which the currents can be detected are defined as most recent correction duty voltages ΔVduty_u(n−1), ΔVduty_v(n−1), and ΔVduty_w(n−1) so as to be distinguished from the correction duty voltages ΔVduty_u, ΔVduty_v, and ΔVduty_w calculated when an electric current can not be detected, correction duty voltages ΔVduty_u, ΔVduty_v, and ΔVduty_w calculated when an electric current can not be detected can be expressed by Equations (26), (27), and (28) provided below.

$$\Delta V\text{duty}\_u = \Delta V\text{duty}\_u(n-1) \times iu^*/iu^*(n-1) \quad (26)$$

$$\Delta V\text{duty}\_v = \Delta V\text{duty}\_v(n-1) \times iv^*/iv^*(n-1) \quad (27)$$

$$\Delta V\text{duty}\_w = \Delta V\text{duty}\_w(n-1) \times iw^*/iw^*(n-1) \quad (28)$$

Moreover, a right member of each of Equations (26) to (28) may be multiplied by a correction coefficient based on a ratio of a supply voltage after the correction to a supply voltage before the correction. The correction coefficient is a value indicating an extent to which the most recent correction duty voltages ΔVduty_u(n−1), ΔVduty_v(n−1), and ΔVduty_w(n−1) calculated based on the supply voltage before the correction increases if calculated based on the supply voltage after the correction. Influence of a change in the supply voltage on the duty ratio can be eliminated by multiplication of the correction coefficient.

Moreover, in the present embodiment, the most recent correction duty voltages ΔVduty_u(n−1), ΔVduty_v(n−1), and ΔVduty_w(n−1) and a value of the supply voltage before the correction are stored in the nonvolatile memory such as EEPROM, and the values are read into nonvolatile memory when the controller is started as in the case of the first embodiment. It thereby becomes possible to perform control with superior accuracy immediately after startup of the controller. The timing at which the values are written into the nonvolatile memory is the same as that described in the first embodiment, and hence its explanation is omitted.

2.2 Advantages of the Second Embodiment

As described above, the motor controller of the present embodiment determines the command voltages based on the command current value and the angular velocity of the rotor in accordance with the motor circuit equation through open loop control. Further, based on the current values detected by the current sensor, the voltage signal specifying the duty ratio for the PWM signals corresponding to the command voltages converted into three-phase voltages is corrected.

Consequently, in the motor controller of the present embodiment, even when the value Φ and the value R included in the motor circuit equation vary due to production variations and temperature variations, the correction duty voltages ΔVduty_u, ΔVduty_y, and ΔVduty_w are determined based on the current values detected by the current sensor, thereby correcting the duty ratio directly. Since an error resultant from conversion of a voltage value into a duty ratio does not occur, the brushless motor can be driven with higher accuracy, thereby producing a desired motor output.

In the motor controller of the present embodiment, it becomes possible to reduce the size, cost, and power consumption of the motor controller by reducing the number of current sensors as in the first embodiment. Moreover, motor control does not become discontinuous by virtue of open loop control, so that generation of sounds or vibrations can be prevented.

The invention claimed is:

1. A motor controller configured to drive a brushless motor, said motor controller comprising:
   a current detection unit configured to detect an electric current flowing through the brushless motor;
   an open loop control unit configured to determine a command value indicating a level of a command voltage for driving the brushless motor in accordance with a motor circuit equation, based on a command current value indicating an amount of electric current to be supplied to the brushless motor and an angular velocity of a rotor in the brushless motor;

a correction unit configured to calculate a correction value based on a difference between the command current value and a current value detected by the current detection unit when the electric current is detected by the current detection unit and to correct the command value according to the calculated correction value, and to correct the command value according to the correction value even when an electric current is not detected by the current detection unit; and a motor drive unit configured to drive the brushless motor using a voltage having a level indicated by the command value corrected by the correction unit, wherein the motor drive unit comprises a switching circuit including a plurality of switching elements and configured to supply an electric current to the brushless motor.

2. The motor controller according to claim 1, wherein the current detection unit, a number of which is only one, is provided between the switching circuit and a power supply.

3. The motor controller according to claim 1, wherein, when the electric current is detected by the current detection unit, the correction unit calculates a d-axis correction voltage value and a q-axis correction voltage value as the correction value based on values determined by subtracting a d-axis current value and a q-axis current value detected by the current detection unit from a d-axis current value and a q-axis current value as the command current value, respectively, and corrects a d-axis command voltage value and a q-axis command voltage value according to the calculated d-axis correction voltage value and the calculated q-axis correction voltage value, and even when the electric current is not detected by the current detection unit, the correction unit calculates the d-axis command voltage value and the q-axis command voltage value according to the d-axis correction voltage value and the q-axis correction voltage value.

4. The motor controller according to claim 1,
wherein the motor drive unit further comprises a signal generation for unit configured to generate a signal for turning on or off each of the plurality of switching elements, and
wherein the correction unit corrects a duty ratio indicating a ratio of an ON period to an OFF period of the signal determined from the command value, based on the correction value.

5. The motor controller according to claim 1, further comprising a nonvolatile storage unit configured to store values,
wherein the correction unit stores the correction value in the nonvolatile storage unit at each of time points with predetermined intervals or when operation of said motor controller is stopped, and reads the correction value stored in the nonvolatile storage unit when said motor controller is started.

6. An electric power steering system comprising a motor controller configured to drive a brushless motor, the motor controller comprising:
a current detection unit configured to detect an electric current flowing through the brushless motor;

an open loop control unit configured to determine a command value indicating a level of a command voltage for driving the brushless motor in accordance with a motor circuit equation, based on a command current value indicating an amount of electric current to be supplied to the brushless motor and an angular velocity of a rotor in the brushless motor;

a correction unit configured to calculate a correction value based on a difference between the command current value and a current value detected by the current detection unit when the electric current is detected by the current detection unit and to correct the command value according to the calculated correction value, and to correct the command value according to the correction value even when an electric current is not detected by the current detection unit; and a motor drive unit configured to drive the brushless motor using a voltage having a level indicated by the command value corrected by the correction unit, wherein the motor drive unit comprises a switching circuit including a plurality of switching elements and configured to supply an electric current to the brushless motor.

7. The electric power steering system according to claim 6, wherein the current detection unit, a number of which is only one, is provided between the switching circuit and a power supply.

8. The electric power steering system according to claim 6, wherein, when the electric current is detected by the current detection unit, the correction unit calculates a d-axis correction voltage value and a q-axis correction voltage value as the correction value based on values determined by subtracting a d-axis current value and a q-axis current value detected by the current detection unit from a d-axis current value and a q-axis current value as the command current value, respectively, and corrects a d-axis command voltage value and a q-axis command voltage value according to the calculated d-axis correction voltage value and the calculated q-axis correction voltage value, and even when the electric current is not detected by the current detection unit, the correction unit calculates the d-axis command voltage value and the q-axis command voltage value according to the d-axis correction voltage value and the q-axis correction voltage value.

9. The electric power steering system according to claim 6,
wherein the motor drive unit further comprises a signal generation unit configured to generate a signal for turning on or off each of the plurality of switching elements, and
wherein the correction unit corrects a duty ratio indicating a ratio of an ON period to an OFF period of the signal determined from the command value, based on the correction value.

10. The electric power steering system according to claim 6, further comprising a nonvolatile storage unit configured to store values,
wherein the correction unit stores the correction value in the nonvolatile storage unit at each of time points with predetermined intervals or when operation of said motor controller is stopped, and reads the correction value stored in the nonvolatile storage unit when said motor controller is started.

* * * * *